United States Patent
Chu et al.

(10) Patent No.: US 11,882,965 B1
(45) Date of Patent: Jan. 30, 2024

(54) MICRO PUREE MACHINE WITH FIXED MOTORS

(71) Applicant: SharkNinja Operating LLC, Needham, MA (US)

(72) Inventors: Ping Chu, Needham, MA (US); Thomas Zhang, Shenzhen (CN); Yanfeng Wang, Shenzhen (CN); Ming Li Shi, Guangdong (CN); Xu Sheng Deng, Needham, MA (US); Kai Ping Hu, Guangdong (CN)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 17/992,278

(22) Filed: Nov. 22, 2022

Related U.S. Application Data (63) Continuation of application No. PCT/CN2022/123017, filed on Sep. 30, 2022.

(51) Int. Cl.
*A47J 43/08* (2006.01)
*A47J 43/07* (2006.01)
*A47J 43/044* (2006.01)

(52) U.S. Cl.
CPC ......... *A47J 43/082* (2013.01); *A47J 43/0711* (2013.01); *A47J 2043/04472* (2013.01)

(58) Field of Classification Search
CPC .................. A47J 43/082; A47J 43/0711; A47J 2043/04472
USPC ........................................................... 99/510
See application file for complete search history.

(56) References Cited

U.S. PATENT DOCUMENTS

| | | | |
|---|---|---|---|
| 2,815,194 A * | 12/1957 | Seyfried | A47J 43/044 248/312.1 |
| 2,829,872 A | 4/1958 | MacDougall | |
| 3,630,493 A | 12/1971 | Carpigiani | |
| 4,693,611 A | 9/1987 | Verkler | |
| 4,705,055 A * | 11/1987 | Rohm | B07B 1/55 210/143 |
| 4,828,398 A | 5/1989 | Verkler | |

(Continued)

FOREIGN PATENT DOCUMENTS

| | | |
|---|---|---|
| CN | 201345883 | 11/2009 |
| CN | 102805194 | 2/2012 |

(Continued)

OTHER PUBLICATIONS

ES1071424 (Year: 2023).*

(Continued)

*Primary Examiner* — Nathaniel E Wiehe
*Assistant Examiner* — Frederick F Calvetti
(74) *Attorney, Agent, or Firm* — Burns & Levinson, LLP; Joseph M. Maraia (57) ABSTRACT

A micro puree machine has a mixing shaft attachable to a blade that is subject to both linear and rotational movement. A drive motor is contained within a lower portion of the machine housing and operatively couples to a first gear that engages a second gear on the mixing shaft for rotation of the mixing blade. A position motor within the upper housing operates to move the mixing blade linearly to engage the ingredients in the bowl. During both axial and rotational movement of the mixing shaft, the drive motor and the position motor remain stationary within their respective positions in the housing.

20 Claims, 11 Drawing Sheets

(56) References Cited

U.S. PATENT DOCUMENTS

| | | |
|---|---|---|
| 5,215,222 A | 6/1993 | McGill |
| 5,415,534 A | 5/1995 | Bertrand et al. |
| 5,803,377 A * | 9/1998 | Farrell ............... A23G 9/045 |
| 6,250,794 B1 | 6/2001 | Huang |
| 6,824,303 B2 | 11/2004 | Huang |
| 7,028,607 B2 | 4/2006 | Zweben |
| 7,264,160 B2 | 9/2007 | Polarine et al. |
| 7,451,613 B2 | 11/2008 | Barraclough et al. |
| 7,993,053 B2 | 8/2011 | McGill |
| 9,351,504 B2 | 5/2016 | Ricco et al. |
| 9,565,868 B2 | 2/2017 | D'Agostino |
| 9,968,222 B2 | 5/2018 | Audette |
| 9,993,015 B2 | 6/2018 | Geng et al. |
| 10,159,262 B2 | 12/2018 | Dong et al. |
| 10,595,544 B2 | 3/2020 | Halachmi |
| 10,660,348 B2 | 5/2020 | Cheung |
| 10,786,119 B2 * | 9/2020 | Cheung ............... A47J 43/255 |
| 10,794,624 B2 | 10/2020 | Rupp |
| 10,801,769 B2 | 10/2020 | Rupp |
| 10,995,976 B2 | 5/2021 | Rupp |
| 11,002,473 B2 | 5/2021 | Rupp |
| 11,083,320 B2 * | 8/2021 | Zhao ................... A47J 19/02 |
| 11,154,075 B2 | 10/2021 | Ricco et al. |
| 11,154,163 B1 * | 10/2021 | He ...................... A47J 43/044 |
| 11,279,609 B2 | 3/2022 | Fonte et al. |
| 11,324,358 B1 * | 5/2022 | O'Loughlin .......... A47J 43/044 |
| 11,337,439 B2 | 5/2022 | Fonte et al. |
| 11,439,158 B2 | 9/2022 | Farina |
| 11,470,855 B2 | 10/2022 | Fonte et al. |
| 11,583,144 B1 * | 2/2023 | Williams ............. A47J 43/0755 |
| 2003/0000240 A1 | 1/2003 | Pahl |
| 2004/0081733 A1 | 4/2004 | Buter et al. |
| 2004/0161503 A1 | 8/2004 | Malone et al. |
| 2005/0047272 A1 | 3/2005 | Sands |
| 2005/0170054 A1 | 8/2005 | Czark et al. |
| 2005/0172826 A1 | 8/2005 | Kim |
| 2005/0173462 A1 | 8/2005 | Stumler et al. |
| 2006/0255066 A1 | 11/2006 | Kannar et al. |
| 2007/0241140 A1 | 10/2007 | Cocchi |
| 2012/0027902 A1 * | 2/2012 | Audette ............... A47J 43/046 |
| | | 366/205 |
| 2012/0048977 A1 | 3/2012 | Machovina et al. |
| 2012/0096876 A1 | 4/2012 | Ravji et al. |
| 2014/0203127 A1 | 7/2014 | Merl |
| 2015/0201808 A1 * | 7/2015 | Katsuki ................ A23N 1/02 |
| | | 241/199.12 |
| 2015/0216360 A1 | 8/2015 | Hosner |
| 2020/0260755 A1 | 8/2020 | Harrison et al. |
| 2021/0055027 A1 | 2/2021 | Rupp |
| 2021/0068419 A1 | 3/2021 | Spirk et al. |
| 2021/0106508 A1 | 4/2021 | Akridge et al. |
| 2021/0120841 A1 * | 4/2021 | Kiser .................... A23G 9/22 |
| 2021/0204564 A1 | 7/2021 | Bellomare et al. |
| 2021/0227848 A1 | 7/2021 | Yang et al. |
| 2021/0371265 A1 | 12/2021 | Fonte et al. |
| 2022/0202247 A1 * | 6/2022 | He ....................... A47J 43/0711 |
| 2022/0202248 A1 * | 6/2022 | O'Loughlin ......... A47J 43/0711 |
| 2022/0202249 A1 | 6/2022 | He et al. |
| 2022/0202254 A1 * | 6/2022 | O'Loughlin ........... G01D 5/145 |
| 2022/0225636 A1 | 7/2022 | Minard et al. |
| 2022/0225831 A1 * | 7/2022 | He ........................ A47J 43/082 |
| 2023/0010316 A1 * | 1/2023 | White ................... A47J 43/082 |

FOREIGN PATENT DOCUMENTS

| | | |
|---|---|---|
| CN | 103168908 | 6/2013 |
| CN | 103181715 | 7/2013 |
| CN | 203088680 | 7/2013 |
| CN | 203152409 | 8/2013 |
| CN | 203233980 | 10/2013 |
| CN | 204362865 | 6/2015 |
| CN | 110168296 | 8/2019 |
| CN | 210642278 | 6/2020 |
| CN | 112042801 | 12/2020 |
| CN | 112469283 | 3/2021 |
| CN | 112512393 | 3/2021 |
| CN | 105828630 | 5/2021 |
| CN | 216282190 | 4/2022 |
| EP | 0314209 | 5/1989 |
| EP | 0891139 | 1/1999 |
| EP | 0995685 | 4/2000 |
| EP | 0891139 * | 5/2002 |
| EP | 1495682 | 1/2005 |
| EP | 1689250 | 8/2006 |
| EP | 2380474 A2 | 10/2011 |
| EP | 3060069 | 8/2016 |
| EP | 3535532 | 9/2019 |
| EP | 3616528 | 3/2020 |
| EP | 3755160 | 12/2020 |
| EP | 3801042 | 4/2021 |
| ES | 1071424 | 2/2010 |
| FR | 2585588 A1 | 2/1987 |
| JP | H01-11029 | 3/1989 |
| WO | 2005048745 | 6/2005 |
| WO | 2005070271 | 8/2005 |
| WO | 2015061364 | 4/2015 |
| WO | 2018085442 | 5/2018 |
| WO | 2019117804 | 6/2019 |
| WO | 2019146834 | 8/2019 |
| WO | 2019200491 | 10/2019 |
| WO | 2019224859 | 11/2019 |
| WO | 2022020653 A1 | 1/2022 |

OTHER PUBLICATIONS

JPH0111029 (Year: 2023).*
EP0891139 (Year: 2023).*
International Search Report and Written Opinion in Application No. PCT/CN2022/123017 dated Mar. 23, 2023, 12 pages.
International Search Report and Written Opinion in Application No. PCT/US2022/053650 dated Jul. 3, 2023, 13 pages.
International Search Report and Written Opinion in Application No. PCT/CN2022/123016 dated Mar. 31, 2023, 11 pages.

* cited by examiner

MICRO PUREE MACHINE WITH FIXED MOTORS

CROSS-REFERENCE TO RELATED APPLICATIONS

This application is a continuation of International Application No. PCT/CN2022/123017 filed on Sep. 30, 2022, entitled MICRO PUREE MACHINE WITH FIXED MOTORS, the entire contents of which are incorporated herein by reference for all purposes.

FIELD OF THE INVENTION

The present disclosure relates to a food processing device and, more particularly, to a micro puree machine for making frozen foods and drinks.

BACKGROUND

Home use machines that are intended to make ice creams, gelatos, frozen yogurts, sorbets and the like are known in the art. Typically, a user adds a series of non-frozen ingredients to a bowl. The ingredients are then churned by a paddle while a refrigeration mechanism simultaneously freezes the ingredients. These devices have known shortcomings including, but not limited to, the amount of time and effort required by the user to complete the ice cream making process. Machines of this nature are impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree style machines can also prepare non-dessert types of foods such as non-dessert purees and mousses. In addition, consumers can prepare either an entire batch of ingredients or a pre-desired number of servings.

Some current micro puree machines have both a position motor for moving the spinning blade up and down relative to the ingredients, and a separate drive motor for rotating the blade. In these cases, the drive motor may be configured to move up and down with the position motor.

SUMMARY

This disclosure describes a micro puree machine in which the mixing shaft attachable to the blade is subject to both linear and rotational movement. A drive motor is contained within a lower portion of the machine housing and operatively couples to a first gear that engages a second gear on the mixing shaft for rotation of the mixing blade. A position motor within the upper housing operates to move the mixing blade linearly to engage the ingredients in the bowl. During both the axial and rotational movement of the mixing shaft, the drive motor and the position motor remain stationary within their respective positions in the housing. This configuration advantageously makes for a less complicated internal drive mechanisms and/or a simpler, more cost effective and robust machine.

Embodiments of the micro puree machine of this disclosure may include one or more of the following, in any suitable combination.

In embodiments, a micro puree machine of this disclosure includes a transmission system. The transmission system includes a drive motor operatively coupled to a first gear, a mixing shaft operatively coupled to a second gear, and a position motor operatively coupled to the mixing shaft to move the mixing shaft axially along a mixing shaft axis. The first gear is configured to drive the second gear to rotate the mixing shaft about the mixing shaft axis. During axial and rotational movement of the mixing shaft, the drive motor and the position motor are configured to remain in a stationary position relative to a housing of a micro puree machine.

In further embodiments, the drive motor extends along a drive motor axis, and the mixing shaft axis extends in a non-parallel direction relative to the drive motor axis. In embodiments, the mixing shaft axis extends at about a 45 degree to about a 55 degree angle relative to the drive motor axis. In embodiments, the position motor is positioned above the drive motor and/or the housing includes an upper housing, and the position motor is positioned within the upper housing. In embodiments, the housing further includes a base for supporting the upper housing. In embodiments, the housing further includes a middle housing extending between the base and the upper housing, and the drive motor is positioned with the middle housing. In embodiments, the drive motor is operatively coupled to the first gear via a plurality of planetary gears. In embodiments, the first and second gears are bevel gears. In embodiments, the drive motor is an AC motor and the position motor is a DC motor.

In yet further embodiments, the mixing shaft is coupled to a first end of an inner shaft. The mixing shaft and the inner shaft are axially moveable along the mixing shaft axis within a fixed outer shaft. In embodiments, a second end of the inner shaft is coupled to a carriage within the housing. In embodiments, at least one threaded rod extends through the carriage. In embodiments, the position motor is operatively coupled to a plurality of gears housed within a gearbox, and one of the plurality of gears engages the at least one threaded rod for rotation of the at least one threaded rod relative to the carriage. In embodiments, the carriage is rotationally constrained such that rotation of the at least one threaded rod relative to the carriage causes the carriage to move axially along the at least one threaded rod. In embodiments, the carriage is rotationally constrained by at least one pillar extending through the carriage. In embodiments, the at least one threaded rod extending through the carriage includes at least two threaded rods extending through the carriage. In embodiments, the carriage is rotationally constrained by the at least two threaded rods. In embodiments, the transmission system further includes a first microswitch on the carriage and a second microswitch on the gearbox. When the mixing shaft reaches its furthest linear travel limit, the first microswitch activates the second microswitch to change rotational direction of the position motor.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the feed chute assembly in any manner.

Figure 1:
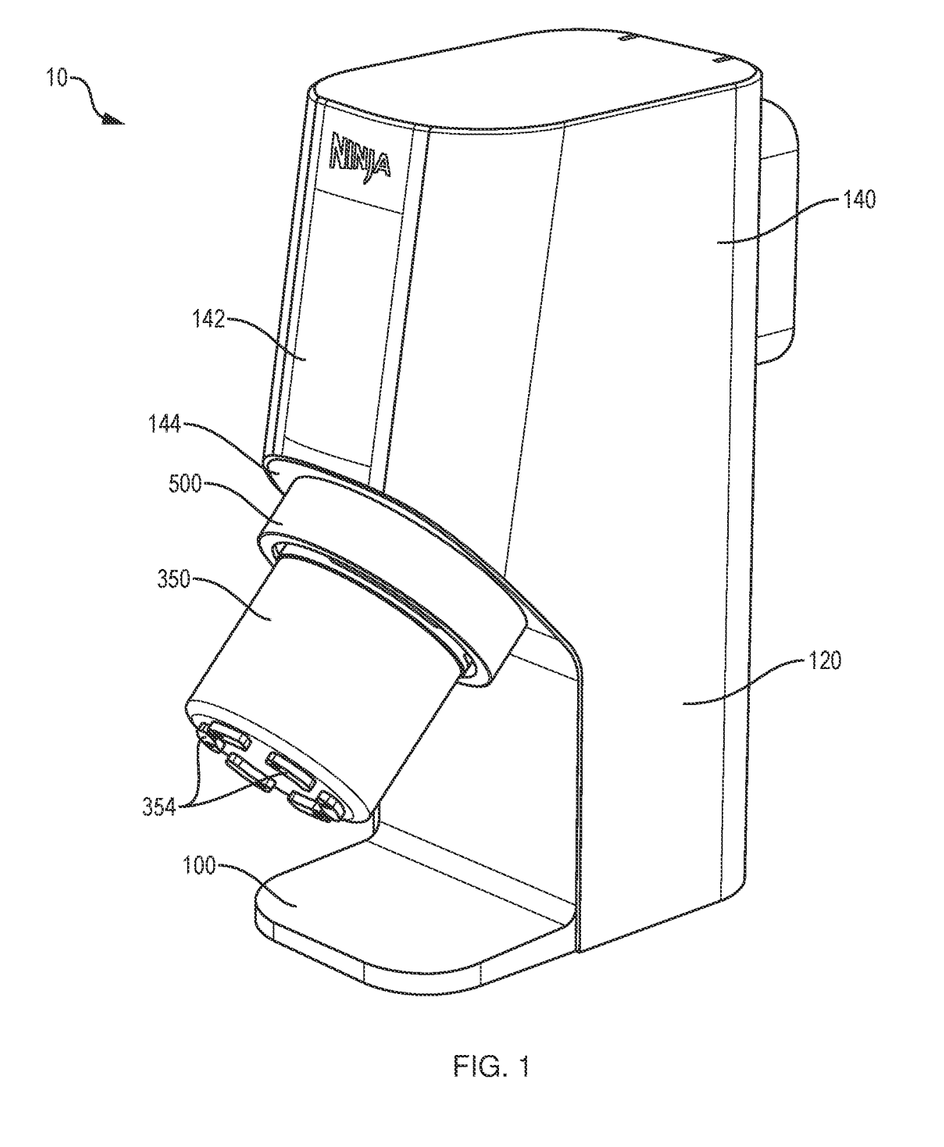
FIG. 1 illustrates a housing and bowl of a micro puree machine according to some embodiments of this disclosure.

FIG. 1 shows an isometric view of a micro puree machine 10 according to an illustrative embodiment of the present disclosure. The micro puree machine 10 may include a base 100 for supporting an upper housing 140. A middle housing 120 may extend between the base 100 and the upper housing 140. The upper housing 140 may include an interface 142 for receiving user inputs to control the micro puree machine 10 and/or display information. The micro puree machine 10 may also include a removable bowl 350. The bowl 350 may contain one or more ingredients for processing. For example, a user may attach the bowl 350 to a coupling 500 on an angled surface 144 of the upper housing 140 by rotating the bowl 350 relative to the coupling 500. In embodiments, the bowl 350 may include features 354 on the bottom surface of the bowl 350 to aid in the fixing of frozen ingredients within the bowl 350. The features 354 may prevent such ingredients from rotational movement within the bowl 350 during use. In embodiments, the bowl 350 can be manufactured from a disposable material to enhance the convenience of using the micro puree machine 10. Further, the bowl 350 can be sold as a stand-alone item and can also be prefilled with ingredients to be processed during use of the micro puree machine 10.

Figure 2A:
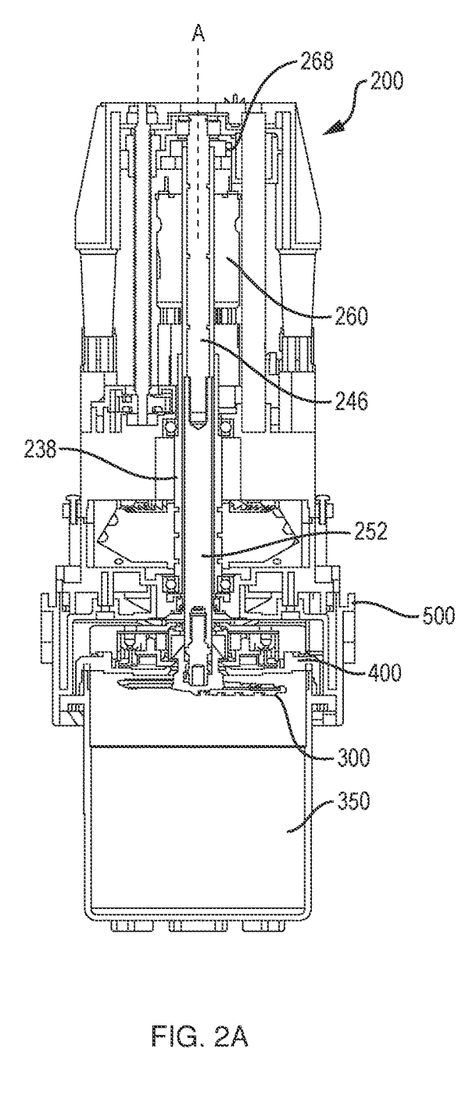
FIGS. 2A and 2B illustrate a portion of a transmission system of the micro puree machine of FIG. 1 according to some embodiments.
Figure 2B:
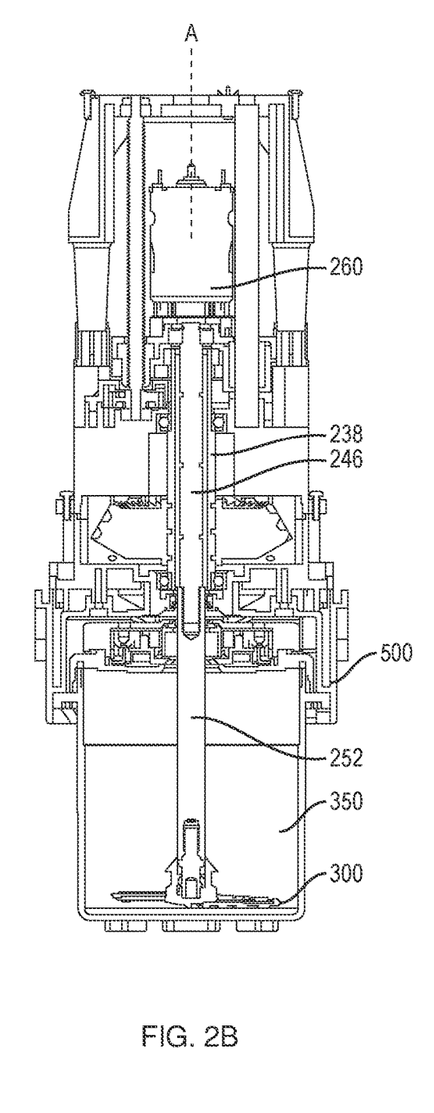

FIGS. 2A and 2B illustrate cross-sectional, front views of a portion of a transmission assembly 200 of the micro puree machine 10 according to some embodiments. As shown in FIG. 2A, the transmission assembly 200 may generally include a position motor 260 positioned within the upper housing 140 and a drive motor 244 (FIG. 3A) positioned within the middle housing 120. A mixing shaft 252 may couple to an inner shaft 246 attached to a moveable carriage 268. In embodiments, the mixing shaft 252 and the inner shaft 246 may extend along a mixing shaft axis A that is perpendicular to the angled surface 144 of the upper housing 140 (FIG. 1). As shown in FIG. 2B, the mixing shaft 252 and the inner shaft 246 may be axially moveable along the mixing shaft axis A relative to a fixed outer shaft 238. When the user assembles the bowl 350 to the coupling 500, a blade 300 inserted into a lid 400 on the bowl 350 may attach to the mixing shaft 252. Actuation of the position motor 260 and the drive motor 244 manually or via the interface 142 may cause both rotation of the mixing shaft 252 and the blade 300 about the mixing shaft axis A and positioning of the mixing shaft 252 and the blade 300 along the mixing shaft axis A to engage with ingredients inside the bowl 350. Thus, the mixing shaft 252, and therefore the blade 300, may be controlled at different rotational speeds via the drive motor 244 and moved up and down via the position motor 260 in different patterns and speeds to make different food items.

Figure 3A:
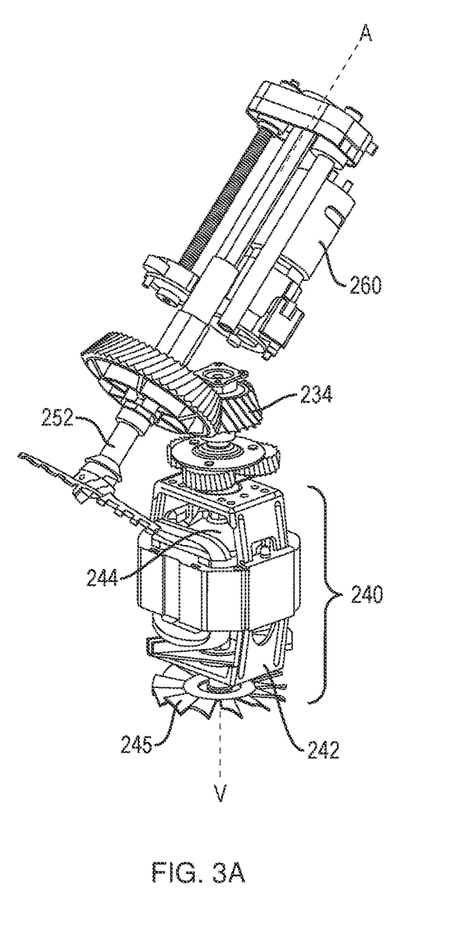
FIGS. 3A-D illustrate the rotational movement of the transmission system of FIGS. 2A and 2B according to some embodiments.
Figure 3B:
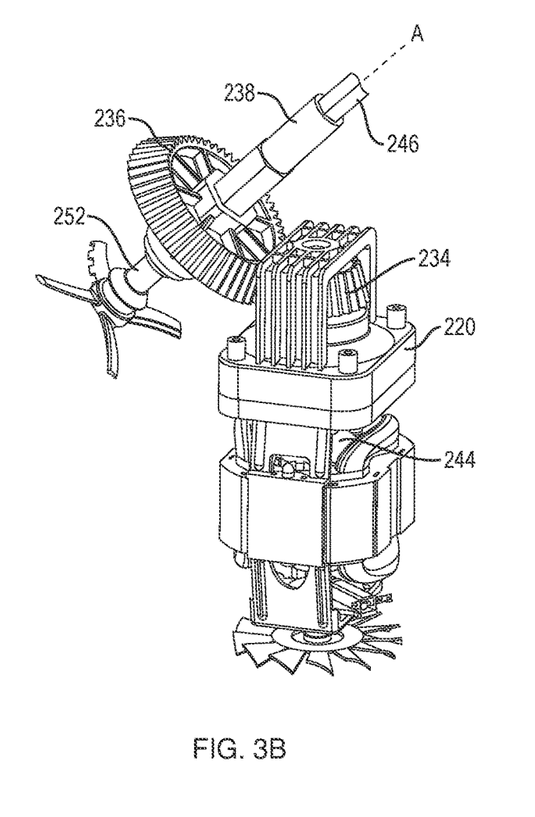

FIGS. 3A-D illustrate the rotational movement of the transmission system 200 according to some embodiments of the disclosure. As shown in FIG. 3A, the transmission system 200 may include a drive motor assembly 240 disposed in the middle housing 120. The drive motor assembly 240 may include a drive motor housing 242 and a drive motor 244. In embodiments, the drive motor 244 may be an AC motor. The drive motor 244 may extend through the middle housing 120 along a drive motor axis V. The drive motor assembly 240 may further include a fan 245 attached to the drive motor 244. In embodiments, the mixing shaft axis A may extend in a non-parallel direction relative to the drive motor axis V. For example, the mixing shaft axis A may extend at about a 45 degree to about a 55 degree angle relative to the drive motor axis V. However, the disclosure also contemplates that the mixing shaft axis A and the drive motor axis V are substantially parallel. As shown in FIG. 3B, in embodiments, the drive motor 244 may drive a first gear 234 via a gearbox assembly 220. In embodiments, the first gear 234 may be a bevel gear. The first gear 234 may be configured to rotate a second gear 236 operatively coupled to the mixing shaft 252. In embodiments, the second gear 236 may be a bevel gear. The second gear 236 may be keyed to the outer shaft 238 through which the inner shaft 246 and the mixing shaft 252 extend. Thus, rotation of the second gear 236 by the first gear 234 may cause rotation of the mixing shaft 252 about the mixing shaft axis A.

Figure 3C:
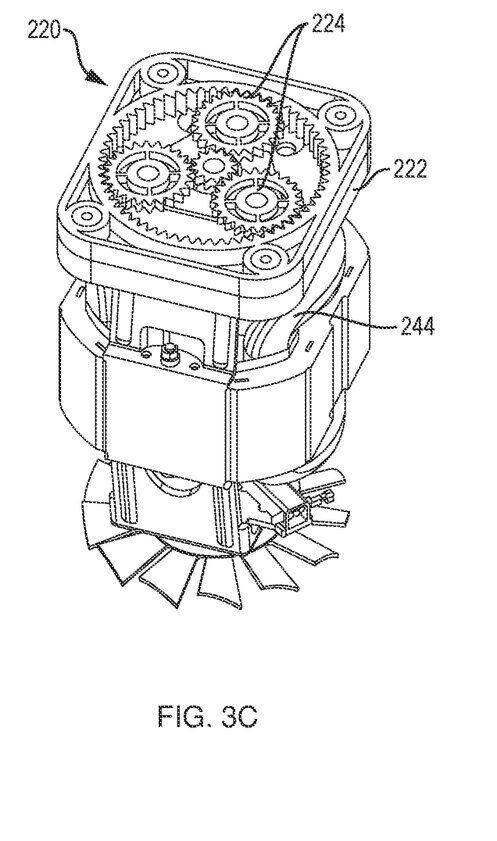
Figure 3D:
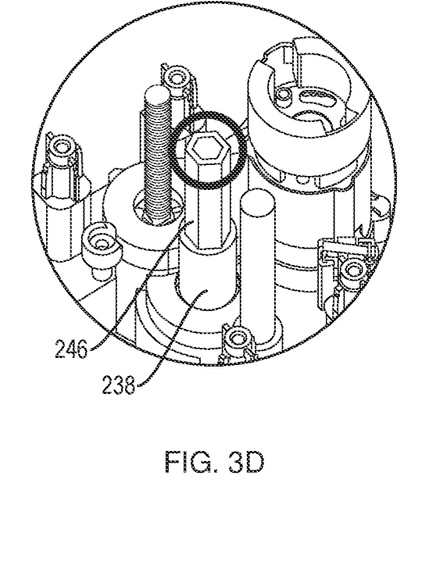

FIG. 3C is a detailed view of the gearbox assembly 220 according to some embodiments. As shown in FIG. 3C, the gearbox assembly 220 may include a gearbox housing 222 containing a plurality of planetary gears 224. In embodiments, the gearbox housing 222 may include upper and lower portions removably attached together. The plurality of planetary gears 224 may operate to deliver power from the drive motor 244 to the first gear 234 for rotating the first gear 234. FIG. 3D furthermore illustrates a detailed view of the outer shaft 238 and the inner shaft 246 according to some embodiments. In embodiments, the outer shaft 238 may have an inner hexagonal profile while the inner shaft 246 has a corresponding outer hexagonal profile. However, the disclosure contemplates other suitable profiles of the outer shaft 238 and the inner shaft 246 such that rotation of the outer shaft 238 causes rotation of the inner shaft 246 and therefore the mixing shaft 252.

Figure 4A:
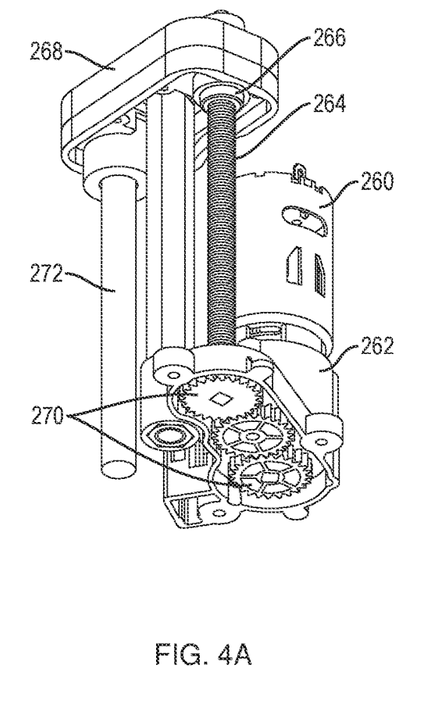
FIGS. 4A-C illustrate the linear movement of the transmission system of FIGS. 2A and 2B according to some embodiments.
Figure 4B:
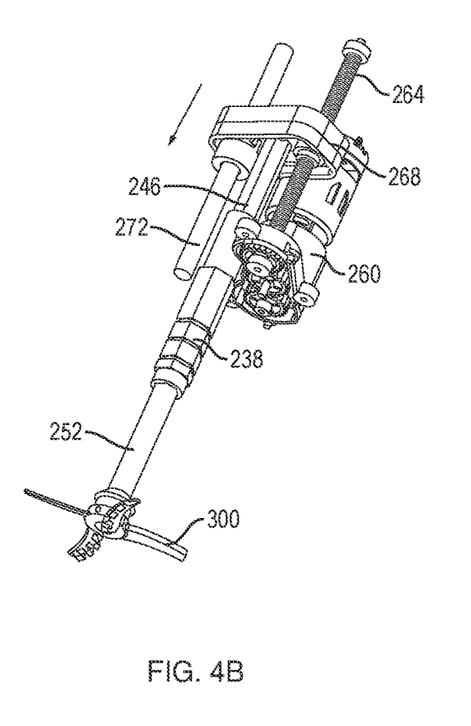
Figure 4C:
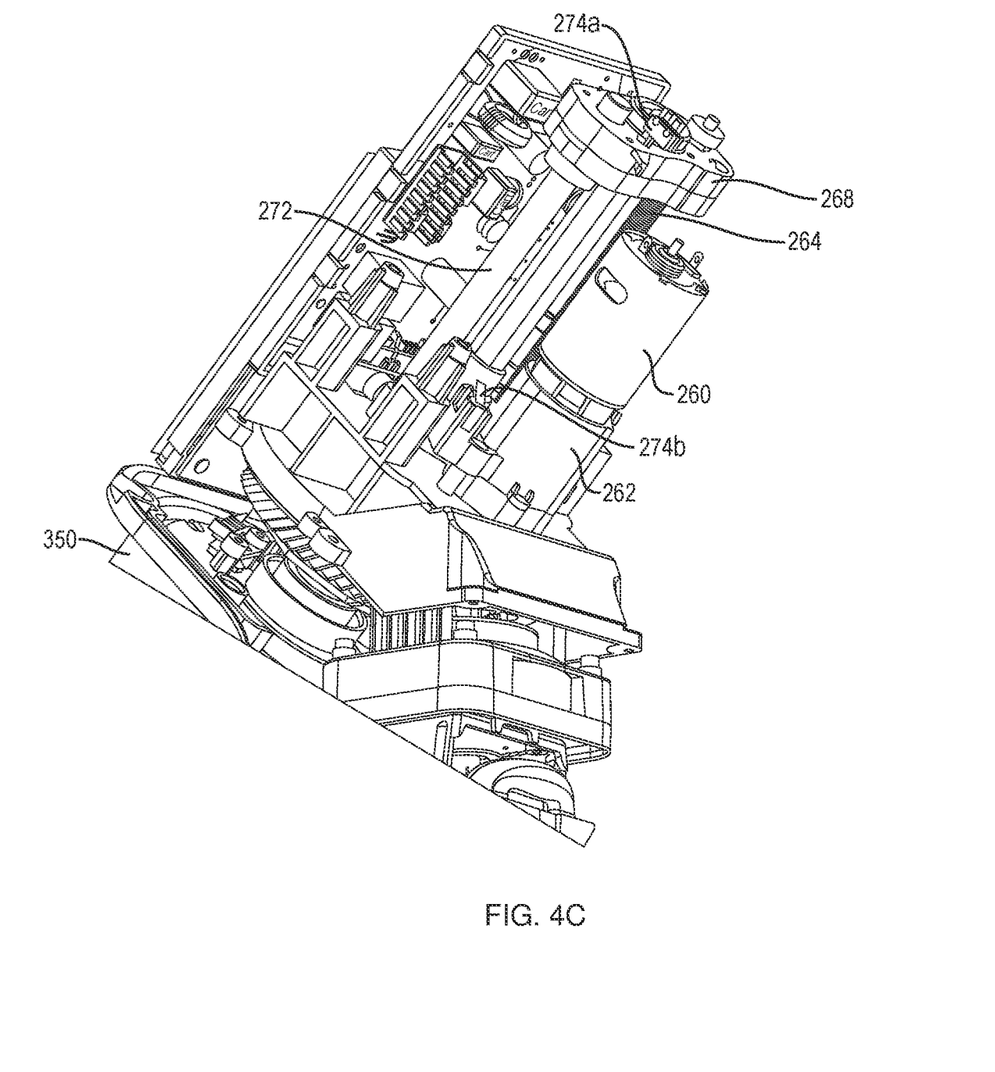

FIGS. 4A-C illustrate the linear movement of the transmission system 200 according to some embodiments. As shown in FIG. 4A, the position motor 260 may rotate in a first direction to drive a gearbox 262 housing a plurality of gears 270. The gear 270 most remote from the position motor 260 may engage at least one threaded rod 264. The threaded rod 264 may rotate inside a threaded nut 266 housed within the carriage 268. The carriage 268 may be constrained rotationally by one or more pillars 272 extending through the carriage 268. Thus, as shown in FIG. 4B, rotation of the threaded rod 264 causes linear movement of the carriage 268 relative to the pillar 272 and the threaded rod 264 while the position motor 260, the pillar 272 and the threaded rod 264 remain stationary within the upper housing 140. A rod pitch of the threaded rod 264 may be selected to relate to a linear decent rate of the carriage 268. The linear movement of the carriage 264 may cause axial movement of the inner shaft 246 and the mixing shaft 252 through the outer shaft 238. As shown in FIG. 4C, when the carriage 268 reaches the end of its travel limit toward the bowl 350, a first microswitch 274a on the carriage 264 activates a second microswitch 274b on the gearbox 262, which signals the position motor 260 to change rotation direction and return the blade 300 to its home position within the lid 400.

Figure 5A:
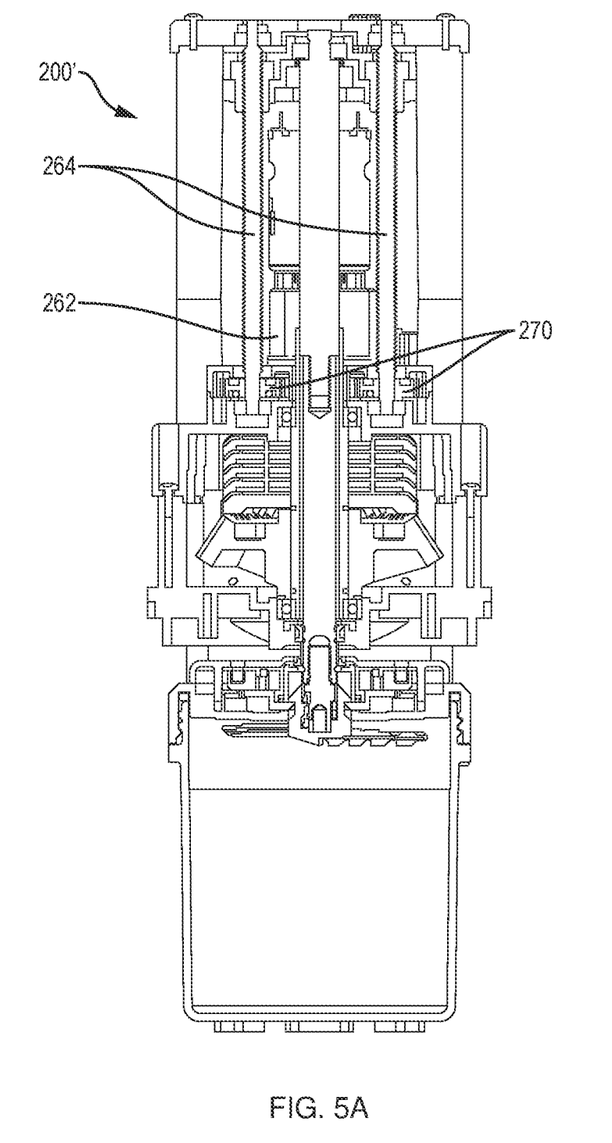
FIGS. 5A and 5B illustrate an alternative version of a transmission system of the micro puree machine of FIG. 1 according to some embodiments.
Figure 5B:
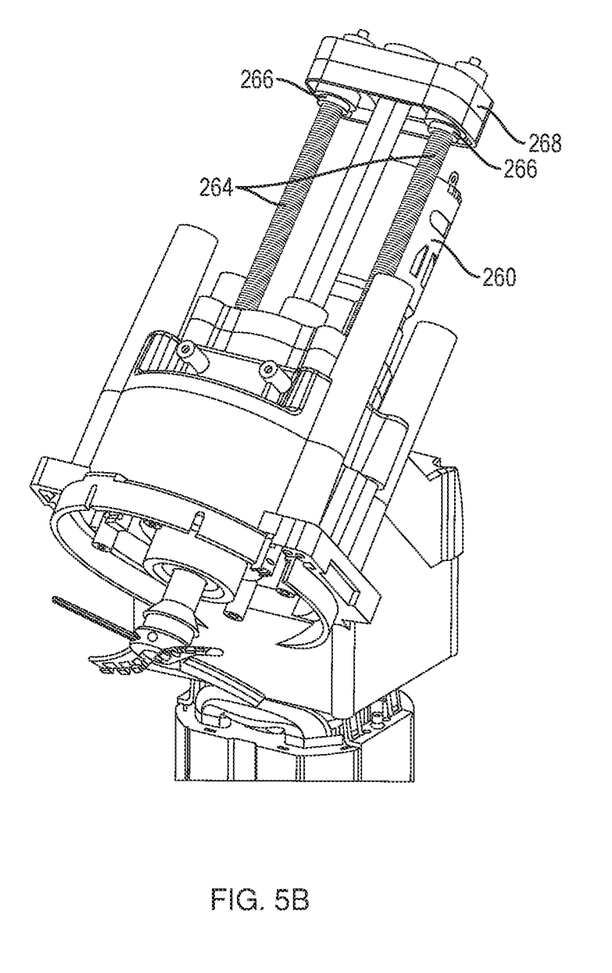

As illustrated above, embodiments of the transmission assembly 200 can include one threaded rod 264 and one pillar 272. However, as shown in FIG. 5A, other embodiments of the transmission assembly 200' can include two threaded rods 264, each engaged with a different gear 270 within the gearbox 262. As shown in FIG. 5B, the threaded rods 264 may rotate inside of threaded nuts 266 housed within the carriage 268. The carriage 268 may be constrained rotationally by both rods 264. Thus, rotation of the threaded rods 264 causes linear movement of the carriage 264 relative to the threaded rods 264 while the position motor 260 and the threaded rods 264 remain stationary within the upper housing 140.

Some embodiments of a micro puree machine as described herein may include one or more transmission elements illustrated in connection with FIGS. 6-8 to transmit power from a motor assembly (e.g., the drive motor assembly 240) to a shaft (e.g., the mixing shaft 252).

Figure 6:
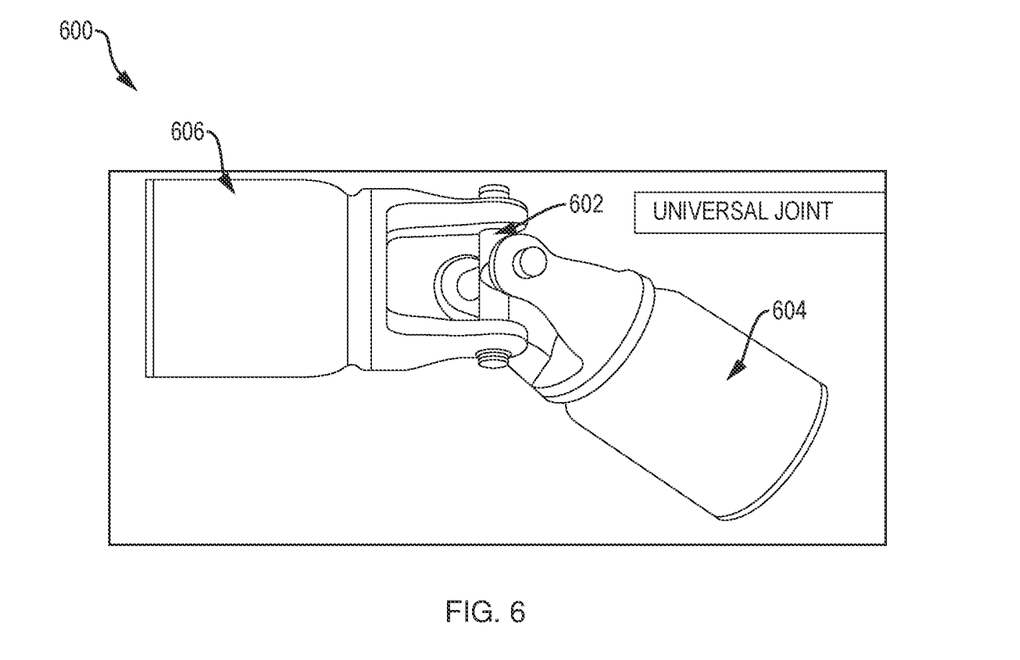
FIG. 6 shows a linkage assembly including a single universal joint that transfers rotational motion from a drive shaft of a drive motor to a drive shaft of a mixing device in a non-parallel orientation with respect to the drive shaft of the drive motor.
Figure 7:
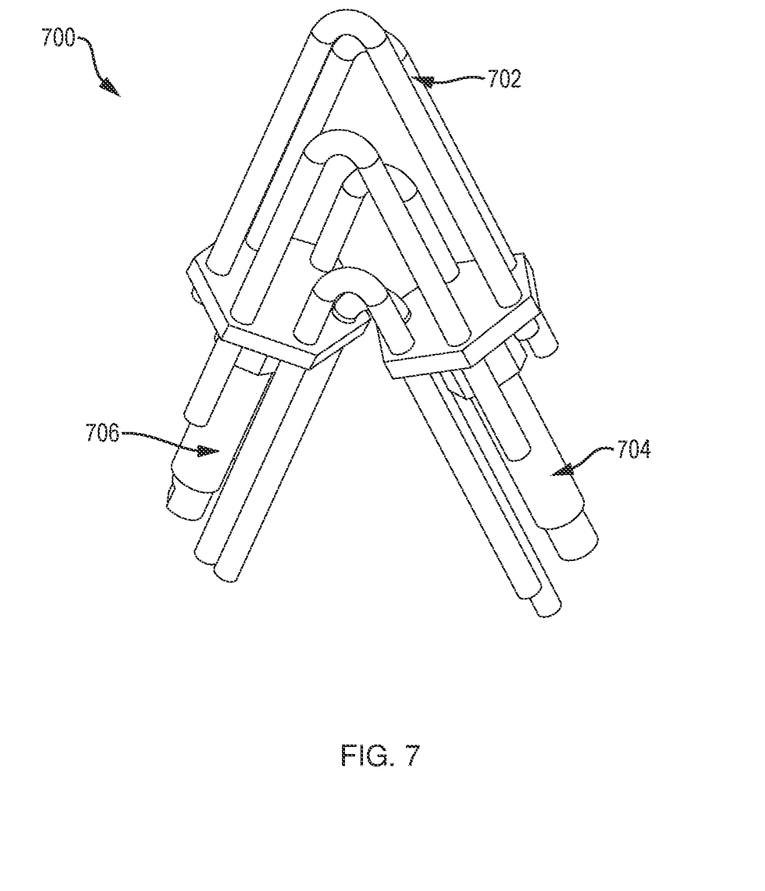
FIG. 7 shows a linkage assembly using angled rods that transfer rotational motion from a drive shaft of a drive motor to a drive shaft of a mixing device oriented in a non-parallel orientation with respect to the drive shaft of the motor.

FIG. 6 shows a linkage assembly 600 including a single universal joint 602 that transfers rotational motion from a drive shaft of a drive motor, e.g., drive motor 244, via a first coupling 604 to a drive shaft, e.g., shaft 252, of a mixing device via a second coupling 606 in a non-parallel orientation with respect to the drive shaft of the drive motor;

FIG. 7 shows a linkage assembly 700 using angled rods 702 that transfer rotational motion from a drive shaft of a drive motor, e.g., drive motor 244, via a first coupling 704 to a drive shaft, e.g., shaft 252, of a mixing device via a second coupling 706 where the drive shaft, e.g., shaft 252, of the mixing device, e.g., a blade assembly, is oriented in a non-parallel orientation with respect to the drive shaft of the motor.

Figure 8:
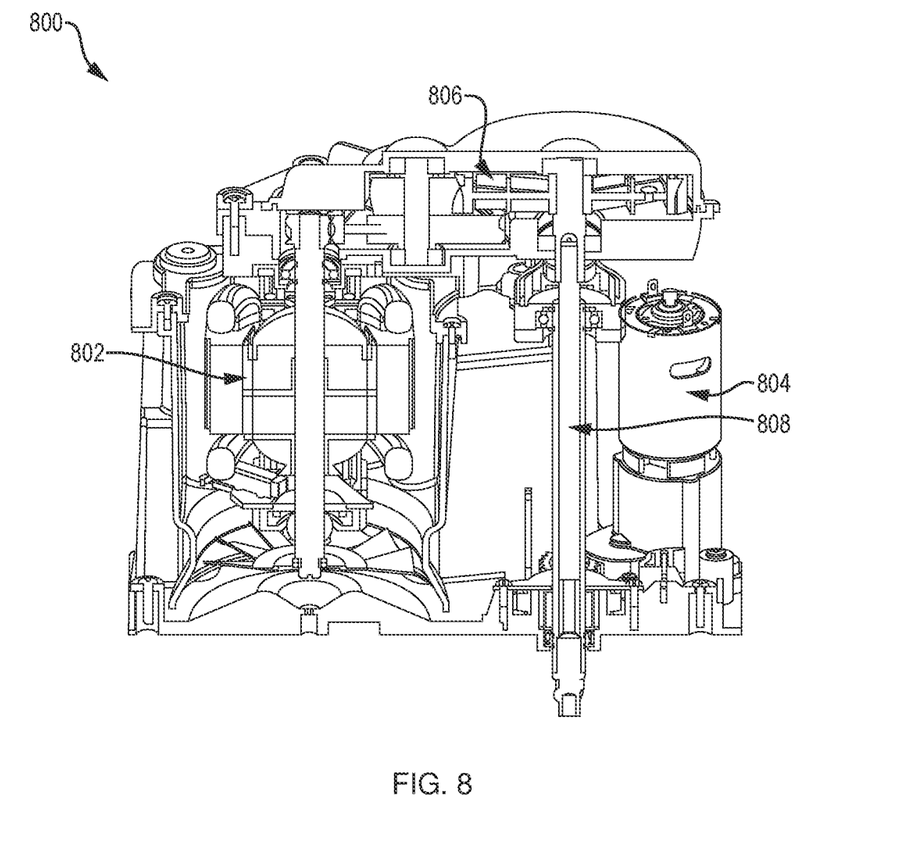
FIG. 8 shows a portion of a transmission system of the micro puree machine includes a stationary position motor and a stationary drive motor coupled to a mixing drive shaft via a gear assembly including non-beveled gears.

FIG. 8 shows a portion of a transmission system 800 within a housing 120 and/or 140 of a micro puree machine 10 having a stationary position motor 804 and a stationary drive motor 802 coupled to a mixing drive shaft 806 via a gear assembly 808 including non-beveled gears.

While the disclosure particularly shows and describes some embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

We claim:

1. A micro puree machine comprising a transmission system, the transmission system comprising:
    a drive motor operatively coupled to a first gear, the first gear rotatable about a first axis;
    a mixing shaft operatively coupled to a second gear, the second gear rotatable about a second axis extending in a non-parallel direction relative to the first axis, the second axis being aligned with a central axis of a processing bowl attached to the micro puree machine; and
    a position motor operatively coupled to the mixing shaft to move the mixing shaft axially along the second axis;
    wherein the first gear is configured to drive the second gear to rotate the mixing shaft about the second axis; and
    wherein, during axial and rotational movement of the mixing shaft, the drive motor and the position motor are configured to remain in a stationary position relative to a housing of a micro puree machine.

2. The micro puree machine of claim 1, wherein the drive motor extends along a drive motor the first axis.

3. The micro puree machine of claim 1, wherein the second axis extends at about a 45-degree to about a 55-degree angle relative to the first axis.

4. The micro puree machine of claim 1, wherein the position motor is positioned above the drive motor.

5. The micro puree machine of claim 1, wherein the housing includes an upper housing, and the position motor is positioned within the upper housing, and wherein the housing further comprises a base for supporting the upper housing.

6. The micro puree machine of claim 5, wherein the housing further comprises a middle housing extending between the base and the upper housing, and the drive motor is positioned with the middle housing.

7. The micro puree machine of claim 1, wherein the drive motor is operatively coupled to the first gear via a plurality of planetary gears.

8. The micro puree machine of claim 1, wherein the first gear is a bevel gear.

9. The micro puree machine of claim 1, wherein the second gear is a bevel gear.

10. The micro puree machine of claim 1, wherein the drive motor is an AC motor.

11. The micro puree machine of claim 1, wherein the position motor is a DC motor.

12. The micro puree machine of claim 1, wherein the mixing shaft is coupled to a first end of an inner shaft, the mixing shaft and the inner shaft being axially moveable along the second axis within a fixed outer shaft.

13. The micro puree machine of claim 12, wherein a second end of the inner shaft is coupled to a carriage within the housing.

14. The micro puree machine of claim 13, wherein at least one threaded rod extends through the carriage.

15. The micro puree machine of claim 14, wherein the position motor is operatively coupled to a plurality of gears housed within a gearbox, and wherein one of the plurality of gears engages the at least one threaded rod for rotation of the at least one threaded rod relative to the carriage.

16. The micro puree machine of claim 15, wherein the carriage is rotationally constrained such that rotation of the at least one threaded rod relative to the carriage causes the carriage to move axially along the at least one threaded rod.

17. The micro puree machine of claim 16, wherein the carriage is rotationally constrained by at least one pillar extending through the carriage.

18. The micro puree machine of claim 15, wherein the at least one threaded rod extending through the carriage includes at least two threaded rods extending through the carriage.

19. The micro puree machine of claim 18, wherein the carriage is rotationally constrained by the at least two threaded rods.

20. The micro puree machine of claim 15, wherein the transmission system further comprises a first microswitch on the carriage and a second microswitch on the gearbox and wherein, when the mixing shaft reaches its furthest linear travel limit, the first microswitch activates the second microswitch to change rotational direction of the position motor.

\* \* \* \* \*